(12) United States Patent
Wu

(10) Patent No.: US 7,039,115 B1
(45) Date of Patent: May 2, 2006

(54) PROCESSOR ALLOCATION FOR CHANNELS IN A VIDEO MULTI-PROCESSOR SYSTEM

(75) Inventor: Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 877 days.

(21) Appl. No.: 09/666,902

(22) Filed: Sep. 20, 2000

(51) Int. Cl.
*H04N 7/12* (2006.01)
(52) U.S. Cl. ............................................. 375/240.26
(58) Field of Classification Search ............ 348/384.1, 348/385.1, 388.1, 389.1, 397.1, 437.1, 438.1; 375/240.01, 240.06; 725/36, 95
See application file for complete search history.

(56) References Cited

U.S. PATENT DOCUMENTS

| | | | |
|---|---|---|---|
| 5,446,726 A * | 8/1995 | Rostoker et al. ............. 370/232 |
| 5,477,397 A | 12/1995 | Naimpally et al. |
| 5,513,181 A * | 4/1996 | Bresalier et al. ............ 370/465 |
| 5,614,955 A | 3/1997 | Rackman |
| 5,617,142 A | 4/1997 | Hamilton |
| 5,619,733 A | 4/1997 | Noe et al. |
| 5,623,312 A | 4/1997 | Yan et al. |
| 5,650,860 A | 7/1997 | Uz |
| 5,694,170 A | 12/1997 | Tiwari et al. |
| 5,701,160 A | 12/1997 | Kimura et al. |
| 5,719,986 A | 2/1998 | Kato et al. |
| 5,768,594 A * | 6/1998 | Blelloch et al. ............ 717/149 |
| 5,838,686 A | 11/1998 | Ozkan |
| 5,923,814 A | 7/1999 | Boyce |
| 5,925,092 A * | 7/1999 | Swan et al. ................. 701/226 |
| 5,933,500 A | 8/1999 | Blatter et al. |
| 5,949,490 A | 9/1999 | Borgwardt et al. |
| 6,038,256 A | 3/2000 | Linzer et al. |
| 6,151,362 A * | 11/2000 | Wang ..................... 375/240.12 |
| 6,167,084 A | 12/2000 | Wang et al. |
| 6,181,742 B1 * | 1/2001 | Rajagopalan et al. ....... 375/240 |
| 6,259,733 B1 * | 7/2001 | Kaye et al. .................. 375/240 |
| 6,275,536 B1 * | 8/2001 | Chen et al. ............. 375/240.25 |
| 6,298,090 B1 * | 10/2001 | Challapali et al. ...... 375/240.29 |
| 6,490,320 B1 * | 12/2002 | Vetro et al. ............. 375/240.08 |
| 6,493,388 B1 * | 12/2002 | Wang ..................... 375/240.12 |
| 6,643,327 B1 * | 11/2003 | Wang ..................... 375/240.12 |
| 2002/0001343 A1 * | 1/2002 | Challapali et al. ...... 375/240.01 |

FOREIGN PATENT DOCUMENTS

EP 0 627 854 12/1994

(Continued)

OTHER PUBLICATIONS

G. Keesman, et al., "Bit-rate control for MPEG encoders," Signal Processing: IMAGE Communication, vol. 6, pp. 545-560, 1995.

(Continued)

*Primary Examiner*—Mehrdad Dastouri
*Assistant Examiner*—Dave Czekaj
(74) *Attorney, Agent, or Firm*—Robert P. Marley

(57) ABSTRACT

An efficient processing system, such as for transcoding video data. In a multi-processor embodiment, channels of data are assigned to processors to maximize the use of the processor resources. A channel complexity measure is made from a sample of each channel, and an accumulated complexity is maintained for each processor based on the complexity of the channels assigned to it. The channels are assigned to the processors such that the most complex channels are assigned first, and the processor with the least accumulated complexity receives the next channel assignment.

22 Claims, 2 Drawing Sheets

FOREIGN PATENT DOCUMENTS

| | | |
|---|---|---|
| EP | 0 851 656 | 7/1998 |
| EP | 0 940 988 | 9/1999 |
| WO | WO 97/46019 | 12/1997 |
| WO | WO 00/21302 | 4/2000 |

OTHER PUBLICATIONS

D. Bagni, et al., "Efficient Intra-frame Encoding and improved Rate Control in H.263 compatible format," NTG Fachberichte, pp. 767-774 XP002095679 ISSN: 0341-0196, Sep. 10, 1997.

Björk, Niklas et al., "Transcoder Architectures for Video Coding," IEEE Transactions on Consumer Electronics, vol. 44, No. 1, Feb. 1998, pp. 88-98.

Staff of Cable Television Laboratories Inc., "Digital TV Solutions," From the Labs: Cable World, Feb. 1, 1999.

Gersho, Allen et al., "Vector Quantization and Signal Compression," 1991 Kluwer Academic Press, Chapter 8. Bit Allocation and Transform Coding, Demand Assignment Integer-Constrained Allocation Algorithm, pp. 230-231.

Boyce, J.M., "Data Selection Strategies for Digital VCR Long Play Mode," *Digest of Technical Papers for the International Conference on Consumer Electronics*, New York, Jun. 21, 1994, pp. 32-33.

G. Keesman, et al., "Transcoding of MPEG bitstreams," Signal Processing: IMAGE Communication, vol. 8, pp. 481-500, 1996.

Gebeloff, Rob., "The Missing Link," http://www.talks.com/interactive/misslink-x.html.

* cited by examiner

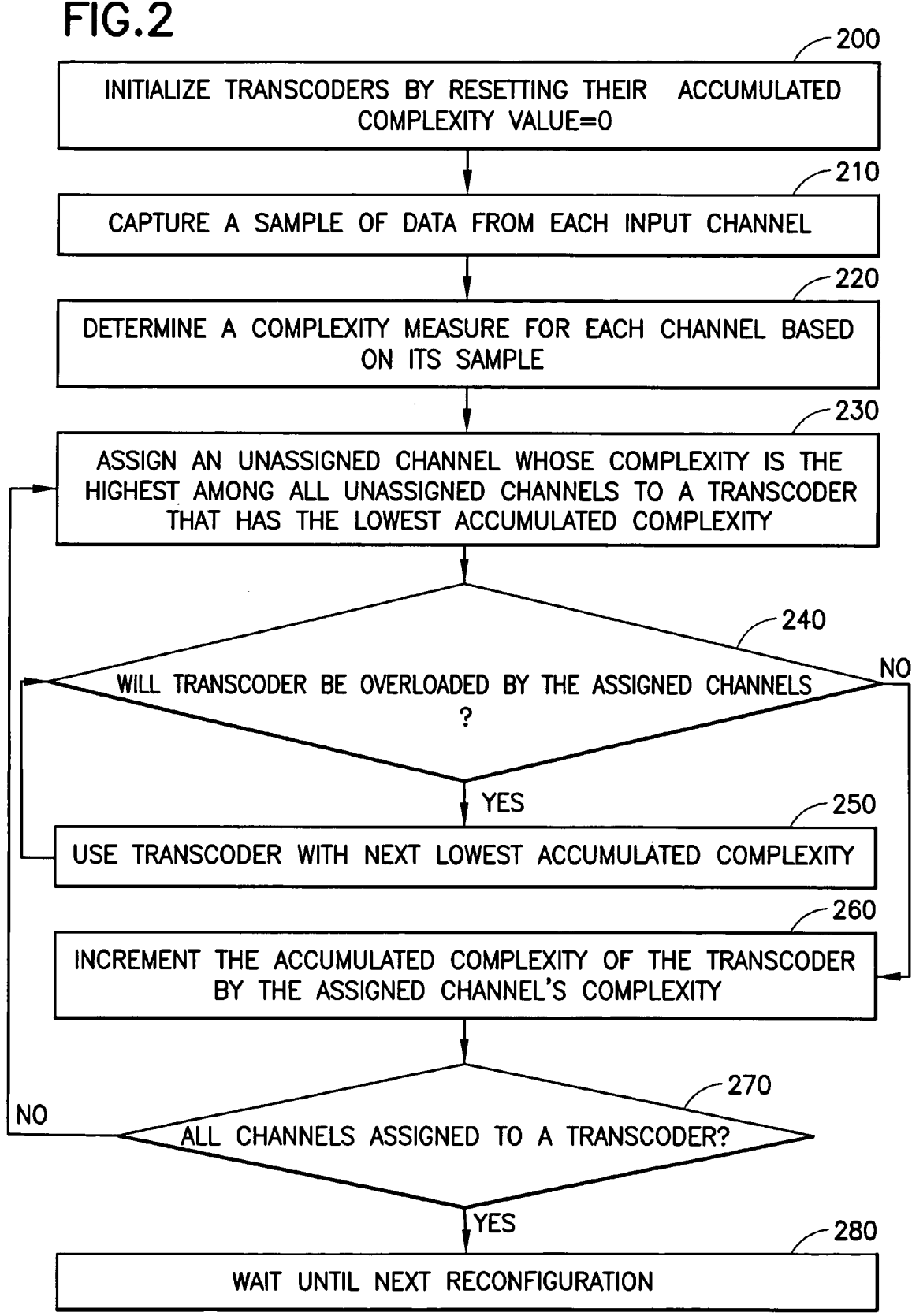

PROCESSOR ALLOCATION FOR CHANNELS IN A VIDEO MULTI-PROCESSOR SYSTEM

BACKGROUND OF THE INVENTION

The present invention relates to a system having one or more processors, such as for the transcoding of digital video signals.

Commonly, it is necessary to adjust a bit rate of digital video programs that are provided, e.g., to subscriber terminals in a cable television network or the like. For example, a first group of signals may be received at a headend via a satellite transmission. The headend operator may desire to forward selected programs to the subscribers while adding programs (e.g., commercials or other content) from a local source, such as storage media or a local live feed. Additionally, it is often necessary to provide the programs within an overall available channel bandwidth.

Accordingly, the statistical remultiplexer (stat remux), or transcoder, which handles pre-compressed video bit streams by re-compressing them at a specified bit rate, has been developed. Similarly, the stat mux handles uncompressed video data by compressing it at a desired bit rate.

In such systems, a number of channels of data are processed by a number of processors arranged in parallel. Each processor typically can accommodate multiple channels of data. Although, in some cases, such as for HDTV, which require many computations, portions of data from a single channel are allocated among multiple processors.

However, there is a need for an improved multi-processor system. Such a system should employ a number of individual transcoders that process data from a number of incoming channels of data. The system should dynamically allocate the individual transcoders to process frames of video data from the channels.

The present invention provides a processor system having the above and other advantages.

SUMMARY OF THE INVENTION

The present invention relates to a system having one or more processors, such as for the transcoding of digital video signals.

In a multi-processor system, video channels are dynamically assigned to the processors based on the estimated processing requirement of each individual channel. Such allocation aims to maximize the utilization of the processing resources, while minimizing the degradation in video quality due to the processing. The greater the processing power (i.e., transcoder throughput), the less the degradation.

A particular method in accordance with the invention for processing a first plurality of channels of video data at a second plurality of processors, includes the steps of: capturing a sample of data from each channel, obtaining a measure of a complexity for each channel based on its sample, assigning each channel to at least one of the processors for processing, and maintaining a running balance of an accumulated complexity for each processor according to the complexity of the channel(s) assigned to it.

The channels are assigned to the processors in an order that is inverse to the channels' complexity such that channels with relatively high complexity are assigned before channels with relatively low complexity.

Additionally, the processor with the least accumulated complexity receives the next channel assignment.

A corresponding apparatus is also presented.

BRIEF DESCRIPTION OF THE DRAWINGS

FIG. 2 illustrates a method for assigning channels of compressed data to a transcoder in a multi-transcoder system in accordance with the invention.

DETAILED DESCRIPTION OF THE INVENTION

Figure 1:
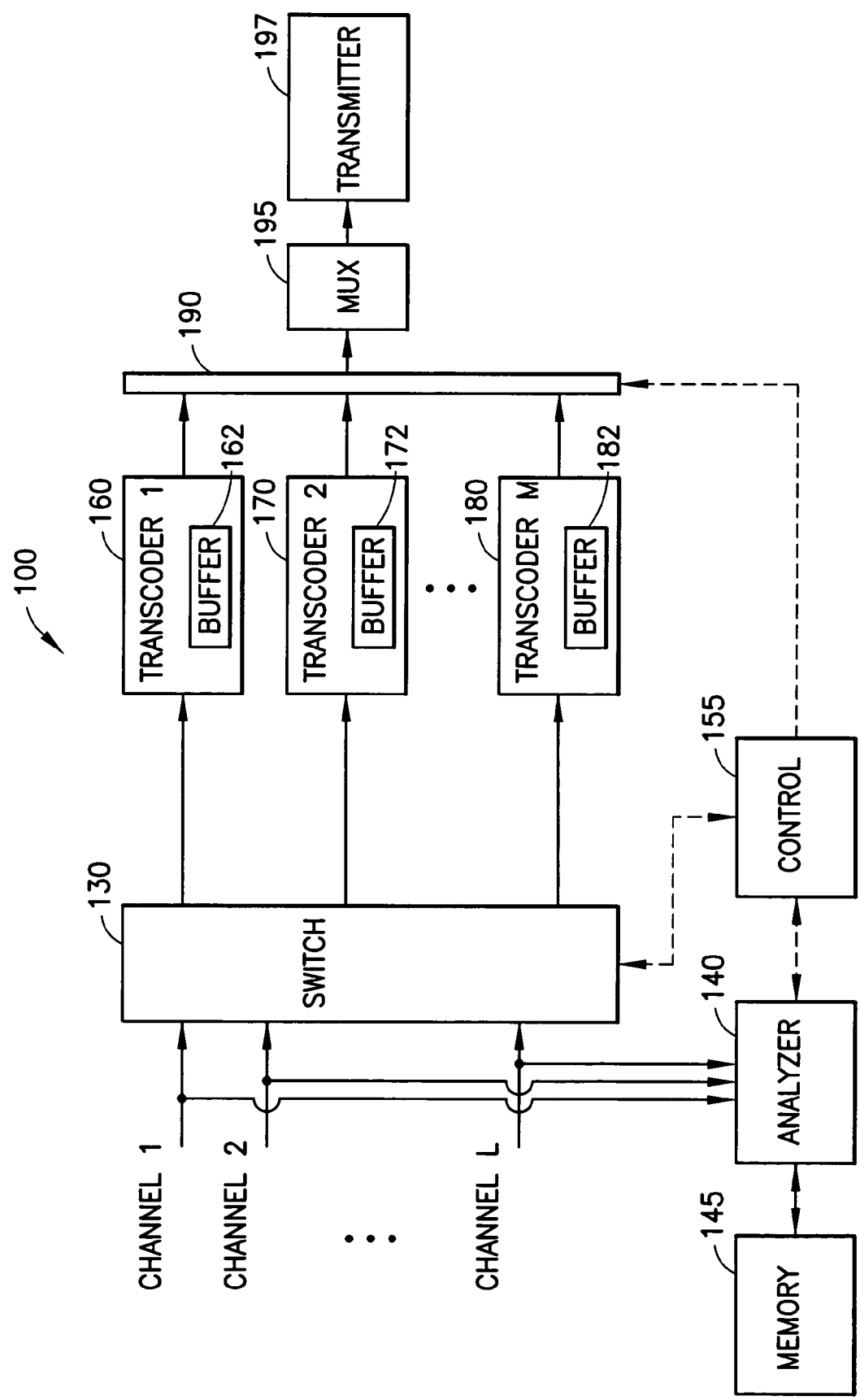
FIG. 1 illustrates a multi-processor system in accordance with the invention.

The present invention relates to a system having one or more processors, such as for the transcoding of digital video signals.

FIG. 1 illustrates a multi-processor system, shown generally at 100, in accordance with the invention.

L channels of compressed data are provided to a switch 130 that is analogous to a demultiplexer. The channels may be provided via a transport multiplex, e.g., at a cable television headend. Some of the channels may be received via a remote distribution point, such as via a satellite, while other channels may be locally provided, such as locally-inserted commercials or other local programming. Conventional demodulation, grooming, buffering steps and the like are not shown, but should be apparent to those skilled in the art.

The switch 130, under the control of a controller 155, routes the channels to one of M transcoders, e.g., transcoder 1 (160), transcoder 2 (170), . . . , transcoder M.

The transcoded data is output via a bus 190, multiplexed at a mux 195, and transmitted via a transmitter 197, e.g., to a terminal population in a cable television network.

A sample (e.g., segment) of each channel is also provided to an analyzer 140, which uses an associated memory 145 to store the samples and analyze them. The results of this analysis are used by the controller 155 in assigning the channels to the different transcoders 160, 170, . . . , 180. The individual transcoders 160, 170, . . . , 180 are also referred to herein as "Transcoder core Processing Elements" or TPEs.

The TPEs are allocated to process the incoming video frames in the different channels when a reconfiguration is required, e.g., when the input channels change (e.g., due to adding, removing or replacing). Note that L can be less than, equal to, or greater than M. That is, a TPE may process more than one channel, e.g., for standard definition television (SDTV), or a single channel may be processed by more than one TPE, e.g., for high-definition television (HDTV), which is much more computationally intensive.

At the TPEs, the channels are parsed to decode the picture types therein, e.g., I, P or B pictures, as known from the MPEG standard, for use in processing.

The invention minimizes the transcoding artifacts subject to the constraint that the average throughput required to transcode each frame at the TPE does not exceed the available processing power of the TPE.

Allocation of channels among the transcoder core processing elements (TPEs).

FIG. 2 illustrates a method for assigning channels of compressed data to TPEs in a multi-transcoder system in accordance with the invention.

The goal of the allocation technique of the present invention is to share workload equally among the TPEs to maximally utilize these resources (i.e., the available throughput of the TPEs). This allocation technique is performed using the analyzer 140 during the startup or reconfiguration process. Start-up is self-explanatory. Reconfiguration occurs when one or more channels are added, deleted or replaced at the multi-processor 100.

Once the allocation technique is completed, the results are communicated to the controller 155.

At box 200, the transcoders are initialized so that an associated accumulated complexity value and an accumulated resolution value are reset to zero. This initialization is done once every time the allocation algorithm is performed.

At box 210, the bitstream analyzer 140 captures in its associated memory 145 a sample of input bitstream from each video channel (box 210). This segment is preferably a minimum of one Group of Pictures (GOP). A sample duration of one second (30 frames) has been successfully used. The bitstream analyzer 140 estimates the processing cycle requirement (e.g., complexity (Comp[i]) discussed below) for each channel based on the picture types (I, B or P) and a resolution of the frames in the captured samples, which is defined as the average number of macroblocks per second in the input bitstream (i.e., an average macroblock rate). The height, width and frame rate information of the pictures are available from the MPEG bitstream headers. From these parameters, the macroblock rate can be derived. Specifically, macroblock rate=(width of picture/16)*(height of picture/16)*frame rate. The MB rate varies when the frame rate changes or video resolution changes, which seldom happens in a MPEG bitstream.

It is assumed that the captured sample is a reasonable representation of the input bit stream's characteristics. Thus, assume each channel has a complexity which is the same as the calculated complexity of its sample. In accordance with the invention, a complexity measure is determined for each i-th channel as a function of the number of B frames and the resolution (box 220). Specifically, the following complexity measure format may be used, although other complexity measures may also be suitable.

$$Comp[i]=F(M[i])*Res[i]*U[i]*G_{CBR}(\text{Input bit rate }[i]-\text{Output bit rate}[i]),$$

where M[i] (M=1,2,3, or higher) is one plus the ratio between the number of B frames and the number ("#") of P and I frames in the segment (i.e., 1+#B/(#P+#I); Res[i], the channel resolution, is the average number of macroblocks per second (i.e., an average macroblock rate); and U[i] is a user-controlled parameter that sets a priority of the channel, if desired. For a higher priority, average priority, or lower priority channel, set U[i]>1, U[i]=1, or U[i]<1. respectively.

Note that the number of macroblocks is constant from frame-to-frame in the MPEG standard. However, different video program providers uses different resolutions (e.g., full resolution, half horizontal resolution, or ¾ horizontal resolution). Since the input channels may come from different sources, they may have different resolutions. Channels that have the same resolution and same GOP structure will have the same complexity. However, the resolution and GOP structure often vary among channels.

If both the input and output of the channel are constant bit rate (CBR), one more factor, $G_{CBR}( )$, which is determined by the difference between input and output bit rate, may be applied. The analyzer 140 can determine the input bit rate, e.g., using a bit counter, and the output bit rate is set by the user.

Experimental or analysis data can be used to determine the functions F( ) and $G_{CBR}$( ). For example: F(M)=(alpha*(M−1)+1)/M, where alpha (e.g., 0.75) is ratio of the nominal complexity of a B frame to the nominal complexity of a P frame. Also, as an example: $G_{CBR}(R)$=beta*R, where beta=0.25 per Mbps.

At box 230, once the complexity estimates are calculated, an iterative "greedy" algorithm can be used to assign the channels to the TPEs as follows. During the assignment process, keep track of an accumulated complexity value for each TPE, which is a sum of the complexity measure of each channel that is assigned to a TPE (recall that multiple channels can be assigned to one TPE). The accumulated complexity is an indication of the processing cycles that will be consumed by each TPE when the channels are assigned to it. Optionally, also keep track of an accumulated resolution, which is a sum of the resolution of each channel that is assigned to a TPE.

For assigning the channels to the TPEs, arrange an array of complexity values, Comp[ ], in descending order. For the assignment of an initial channel, assign the unassigned channel of highest complexity to a first TPE, such as TPE 160. The first-assigned TPE can be chosen randomly, or in a arbitrarily predefined manner, since all TPEs have an equal accumulated complexity of zero at this time.

Generally, if there is a tie in the channels' complexity values, select the channel with the highest resolution. If there is a tie again, select the lower channel number or, otherwise, select randomly from among the tied channels.

For the assignment of channels after the initial channel, select the TPE that has the lowest value of accumulated complexity. If there is a tie, choose the TPE with lower accumulated resolution. If there is a tie again, choose the TPE with the smaller number of channels already assigned to it. If there is a tie again, choose the TPE with a lower TPE number, or otherwise randomly from among the tied TPEs.

At box 240, a check is made to determine if the assignment of the channel will result in an overload of the TPE. This may occur when a sum of the accumulated resolution and the resolution of the selected channel exceeds some predefined upper bound (e.g. 121,500) that is specific to the processing power of the TPE. For example, assuming that one TPE can handle, at most, three full resolution (720×480 pixel) channels, with 16×16 macroblocks, the total resolution is 3*(720/16)*(480/16)*30=121,500 macroblocks. Additionally, an upper bound may be imposed on the maximum number of channels that are assigned to a TPE that is, again, specific to the TPE design.

At box 250, if it is determined that the assignment of the channel with the highest complexity among the unassigned channels would result in an overload condition, the channel is assigned to the transcoder with the next lowest accumulated complexity.

If no such overload condition is presented, increment the accumulated complexity of the TPE that just had a channel assigned to it by the complexity of the assigned channel (box 260). Also, increment the accumulated resolution of the TPE by the resolution of the assigned channel.

Note that the accumulated complexity and accumulated resolution for a TPE are relevant concepts when more than one channel is assigned to a TPE, which is assumed to be the case here. If only a single channel is assigned to a TPE, the accumulated complexity and accumulated resolution are the same as the complexity and resolution, respectively, of the assigned channel, and there is no concern with overloading the TPE, assuming its processing power is adequate for the one channel.

At box 270, if all channels have been assigned to a transcoder, the process is complete, and wait until the next reconfiguration (box 280), when the process is repeated starting at box 200. If additional channels are still to be assigned, processing continues again at box 230 by assigning the remaining unassigned channel with the highest complexity to a TPE with the lowest accumulated complexity without overloading a TPE.

Essentially, the channels are assigned in an order from the highest complexity channel to the lowest complexity channel. Moreover, for each assignment, the transcoder with the lowest accumulated complexity at the time is selected.

Note that, in the present example, it is assumed that a channel is processed by only one TPE. When the number of channels is less than or equal to the number of TPEs, then one channel is assigned to one TPE. It also is possible to extend the invention to the case where there are channels (e.g., HDTV channels) that require more than one TPE to process. Specifically, at box 240, if the TPE of lowest accumulated complexity would be overloaded by the HDTV channel, assign a fraction (portion) of this channel to just fill up the TPE to its maximum throughput (box 230). Then, again at box 230 for the next channel assignment cycle, assign the remainder of the channel (or assign another fraction of the channel if necessary to again avoid an overload condition) to the TPE of next lowest accumulated complexity, until the entire channel is assigned.

Generally, the HDTV channel or channels are assigned first to the required number of TPEs. Then, the remaining TPE throughput is assigned to the channels that require only a fraction of the throughput of a TPE to process, as discussed.

Note that all channels need not be synchronous (e.g., frame aligned), and the sample used by the analyzer 140 need not start and end at a frame boundary. The sample of the input bitstream should be of sufficient length that it accurately represents the statistics of the associated channel. Moreover, note that the analysis is only performed on the bitstream samples, and does not have to be in real time.

Accordingly, it can be seen that the present invention provides an efficient video processor system, wherein channels of data are assigned to processors based on a channel complexity measure to maximize the use of the processor resources.

Although the invention has been described in connection with various preferred embodiments, it should be appreciated that various modifications and adaptations may be made thereto without departing from the scope of the invention as set forth in the claims.

For example, the invention can be used with encoders (which code uncompressed source data) as well as transcoders. For example, in an encoder application, one can use the amount of motion in the input video to estimate the "complexity" of a channel, and then allocate the processing resources to encode a number of channels using the allocation algorithm described herein.

Additionally, while in the implementation discussed, the TPEs are identical, the algorithm could be modified to deal with TPEs of different processing power. Specifically, in block 230 of FIG. 2, instead of selecting the TPE with the lowest accumulated complexity, one could select the TPE of lowest percentage utilization, which is defined as the (accumulated complexity/maximum complexity the TPE can handle).

Also, note that audio data is passed through in the video encoding and transcoding embodiments discussed herein, but the concept of processor allocation could be applied to audio or other types of data.

What is claimed is:

1. A method for processing a first plurality of channels of video data at a plurality of processors, comprising the steps of:

capturing a sample of data from each channel of said plurality of channels;

obtaining a measure of complexity for each channel of said first plurality of channels based on the sample of data captured for that channel, wherein the measure of the complexity for each of said captured samples of data is a function of a ratio of the number of B-frames to the sum of the number of P-frames and I-frames thereof;

assigning each channel to at least one of the processors for processing thereat, wherein the processors comprise respective transcoders for transcoding the channels assigned thereto; and maintaining a running balance of an accumulated complexity for each processor according to the complexity of the channel(s) assigned thereto; wherein:

the channels are dynamically assigned to the processors such that channels with relatively high complexity are assigned before channels with relatively low complexity.

2. The method of claim 1, wherein:

the channels are assigned to the processors such that the processor with the least accumulated complexity receives a next channel assignment.

3. The method of claim 1, wherein:

the channels are assigned to the processor such that the processor with the least portion of utilization receives a next channel assignment.

4. The method of claim 1, wherein:

each of the samples comprises a plurality of video frames.

5. The method of claim 1, wherein:

the measure of the complexity for each sample is a function of group of pictures (GOP) structure thereof.

6. The method of claim 1, wherein:

the measure of the complexity for each sample is a function of a pixel resolution thereof.

7. The method of claim 1, wherein:

the measure of the complexity for each sample is a function of a frame rate thereof.

8. The method of claim 1, wherein:

the measure of the complexity for each sample is a function of and average macroblock rate thereof.

9. The method of claim 1, wherein the measure of the complexity for each sample is a function of a channel priority thereof.

10. The method of claim 1, wherein:

the measure of the complexity for each sample that has a first constant bit rate when assigned to the associated processor, and a second, different constant bit rate when processed at the associated processor, is a function of a difference between first and second constant bit rates.

11. The method of claim 1, wherein:

the running balance of accumulated complexity for each processor is incremented by the complexity of the channel(s) assigned thereto.

12. The method of claim 1, comprising the further step of:

preventing the assignment of a respective one of the channels to a respective processor if such an assignment will result in overloading the respective processor.

13. The method of claim 1, wherein:

the channels include at least one particular channel that requires more than one of the processors for processing; and a plurality of portions of the particular channel are assigned respective ones of the processors such that at least a first one of the portions consumes a maximum throughput of a respective one of the processors.

14. The method of claim 13, wherein:
the particular channel comprises high-definition television (HDTV) data.

15. The method of claim 1, wherein:
the channels are assigned to the processors in an order such that the most complex channel, or a selected one of a plurality of equally most complex channels, is assigned first, and the least complex channel, or a selected one of a plurality of equally least complex channels, is assigned last.

16. The method of claim 15 comprising the further steps of:
obtaining a measure of a resolution for each channel based on the sample captured for that channel; and
maintaining a running balance of an accumulated resolution for each processor according to the resolution of the channels(s) assigned thereto.

17. The method of claim 16, wherein:
of the plurality of equally most complex channels, the one with the highest resolution is assigned first.

18. The method of claim 16, wherein:
of the plurality of equally least complex channels, the one with the lowest resolution is assigned last.

19. The method of claim 16, comprising the further steps of:
preventing the assignment of a respective one of the channels to a respective processor if such an assignment will cause a sum of: (a) the accumulated resolution of the respective processor, and (b) the resolution of the respective channel, to exceed a predefined upper bound.

20. The method of claim 15, wherein:
the channels are assigned to the processors such that the processor with the least accumulated complexity receives a next channel assignment.

21. The method of claim 20, wherein:
if a plurality of processors have the same accumulated complexity, the one with the least accumulated resolution receives the next channel assignment.

22. An apparatus for processing a first plurality of channels of video data at a plurality of processors, comprising:
means for capturing a sample of data from each channel of said plurality of channels;
means for obtaining a measure of complexity for each channel of said first plurality of channels based on the sample of data captured for that channel, wherein the measure of the complexity for each of said captured samples of data is a function of a ratio of the number of B-frames to the sum of the number of P-frames and I-frames thereof;
means for assigning each channel to at least one of the processors for processing thereat, wherein the processors comprise respective transcoders for transcoding the channels assigned thereto; and
means for maintaining a running balance of an accumulated complexity of the channel(s) assigned thereto; wherein:
the channels are dynamically assigned to the processors such that channels with relatively high complexity are assigned before channels with relatively low complexity.

* * * * *